United States Patent
Ponnuswamy

(10) Patent No.: US 9,041,604 B2
(45) Date of Patent: *May 26, 2015

(54) APPARATUS AND METHOD FOR PRODUCING A MULTI-PATTERN WIRELESS FRAME

(75) Inventor: Subburajan Ponnuswamy, Scotts Valley, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,851

(22) Filed: Jul. 10, 2012

(65) Prior Publication Data

US 2012/0281785 A1    Nov. 8, 2012

Related U.S. Application Data

(63) Continuation of application No. 12/432,614, filed on Apr. 29, 2009, now Pat. No. 8,223,072.

(51) Int. Cl.
*H01Q 3/12* (2006.01)
*H04W 52/42* (2009.01)
*H04B 7/04* (2006.01)
*H04W 52/32* (2009.01)

(52) U.S. Cl.
CPC .............. *H04W 52/42* (2013.01); *H04B 7/0408* (2013.01); *H04W 52/322* (2013.01)

(58) Field of Classification Search
CPC ............................................... H01Q 3/12
USPC ..................... 342/374, 367, 368, 436
See application file for complete search history.

(56) References Cited

U.S. PATENT DOCUMENTS

| 5,890,067 | A | 3/1999 | Chang et al. | |
| 6,563,807 | B1* | 5/2003 | Kim et al. | 370/331 |
| 7,324,605 | B2* | 1/2008 | Maltsev et al. | 375/299 |
| 7,421,012 | B1* | 9/2008 | Feng et al. | 375/148 |
| 7,511,663 | B2* | 3/2009 | Wang et al. | 342/367 |
| 7,737,890 | B2* | 6/2010 | Wang et al. | 342/367 |
| 7,903,973 | B1* | 3/2011 | Uhlhorn et al. | 398/77 |
| 8,223,072 | B2 | 7/2012 | Ponnuswamy | |
| 2004/0177306 | A1* | 9/2004 | Hiraki | 714/748 |
| 2004/0196822 | A1* | 10/2004 | Proctor, Jr. | 370/349 |
| 2005/0013391 | A1* | 1/2005 | Boer et al. | 375/340 |
| 2005/0075142 | A1* | 4/2005 | Hoffmann et al. | 455/562.1 |
| 2005/0157671 | A1* | 7/2005 | Sugitani | 370/324 |
| 2005/0285803 | A1* | 12/2005 | Iacono et al. | 343/702 |
| 2006/0154624 | A1* | 7/2006 | Suzuki | 455/118 |
| 2006/0209978 | A1* | 9/2006 | Jungnickel et al. | 375/267 |

(Continued)

OTHER PUBLICATIONS

"The Pin Diode Circuit Designers' Handbook", Microsemi-Watertown, 1998, pp. 1-137, Microsemi Corporation.

(Continued)

*Primary Examiner* — Harry Liu
(74) *Attorney, Agent, or Firm* — Ying Wang

(57) ABSTRACT

Multi-pattern transmission of frames. The method of operations comprises transmitting a first portion of a frame using a first radiation pattern. The frame comprises one or more preambles and a single data portion associated with the one or more preambles. Thereafter, an operation is conducted to switch the radiation pattern from the first radiation pattern, used to produce the first portion of the frame, to a second radiation pattern. A second portion of the same frame is produced using the second radiation pattern.

27 Claims, 3 Drawing Sheets

(56) References Cited

U.S. PATENT DOCUMENTS

| | | | |
|---|---|---|---|
| 2007/0064706 A1* | 3/2007 | Fontaine et al. | 370/394 |
| 2007/0253324 A1* | 11/2007 | Ma et al. | 370/208 |
| 2008/0051097 A1* | 2/2008 | Kwon | 455/450 |
| 2008/0274748 A1 | 11/2008 | Lastinger et al. | |
| 2009/0041148 A1* | 2/2009 | Li et al. | 375/267 |
| 2009/0060088 A1* | 3/2009 | Callard et al. | 375/299 |
| 2009/0150537 A1* | 6/2009 | Fanson | 709/224 |
| 2009/0232122 A1* | 9/2009 | Suda et al. | 370/345 |
| 2010/0027603 A1* | 2/2010 | Beadle et al. | 375/226 |
| 2011/0032953 A1* | 2/2011 | Lee et al. | 370/535 |
| 2011/0065448 A1 | 3/2011 | Song et al. | |
| 2013/0273934 A1 | 10/2013 | Meredith et al. | |

OTHER PUBLICATIONS

U.S. Appl. No. 12/432,614, Non-Final Office Action, mailed Dec. 23, 2010.

U.S. Appl. No. 12/432,614, Final Office Action, mailed Apr. 15, 2011.

U.S. Appl. No. 12/432,614, Non-Final Office Action, mailed Nov. 18, 2011.

* cited by examiner

APPARATUS AND METHOD FOR PRODUCING A MULTI-PATTERN WIRELESS FRAME

CROSS-REFERENCE OF RELATED APPLICATIONS

This is a continuation application of U.S. patent application Ser. No. 12/432,614, now U.S. Pat. No. 8,223,072, the entire contents of which are incorporated by reference. The applicant(s) hereby rescind any disclaimer of claim scope in the parent application(s) or the prosecution history thereof and advice the USPTO that the claims in this application may be broader than any claim in the parent application(s).

FIELD

The present invention relates to wireless digital networks, and in particular, to the problem of transmitting information in dense or crowded RF environments and improving the reliability of transmissions in any environment.

BACKGROUND OF THE INVENTION

Wireless digital networks, such as those operating to IEEE802.11 Ethernet standards, use wireless access nodes connected to controllers and provide a wide range of services to wireless clients, such as access to infrastructure devices and services such as printers and file servers, as well as to the greater Internet. In RF-dense environments like those found in corporate offices, it is common to have many devices, wireless access nodes and wireless clients both, operating in close proximity.

When devices operate in close proximity, both in terms of physical location and radio frequencies, opportunities for interference arise. Such interference can occur not only when devices operate on the same channel, but when devices operate on partially overlapping or adjacent channels. As an example, in the U.S. 2.4 GHz ISM band, the three non-overlapping channels are 1, 6, and 11. Channels 1 and 3, for example, partially overlap. Channels 1 and 6 are adjacent, but they can still interfere with each other depending on the proximity of the devices and strength of transmissions. This 2.4 GHz band is also shared with services such as Bluetooth, wireless telephones, microwave ovens, and other devices which intentionally or unintentionally radiate RF energy.

The design of IEEE802.11 protocols alleviates these problems to a certain degree by implementing carrier sense and collision avoidance; before a device transmits on a channel, it first listens for activity. If it detects activity on the channel, it backs off for a minimum predetermined time or a randomly chosen time within a predetermined range, and checks again. In this "carrier sense" approach, the device senses for energy and carrier at the transmitter and defers the transmission if energy or carrier is detected, and it does not have the necessary intelligence to determine if the detected energy or carrier would actually interfere with its own transmission and vice versa.

It is known to the art that the "interference range" of a device is commonly greater than the "communications range," that is, a device is capable of causing interference to other devices at greater distances than it is capable of establishing communications.

What is needed is a better method of operating in RF environments.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of transmitting wireless data frames. According to the present invention, a digital device contains a transmitter feeding an electronically steerable antenna system where the radiation pattern produced by the antenna system may be electronically selected. A first portion of a wireless data frame such as a data frame according to one or more IEEE 802.11 standards is transmitted using an a first radiation pattern, and a second portion of the same frame is transmitted using a second radiation pattern. The first and second portions may be transmitted using an electronically steerable antenna system that supports the ability to switch or electronically alter radiation patterns. The antenna system may use one antenna with switchable elements, or may use different antennas with different radiation patterns. When multiple antennas are used, the first antenna may be an omnidirectional antenna, and the second antenna may be one of a group of antennas providing beam-forming or sectorized coverage.

Figure 1:
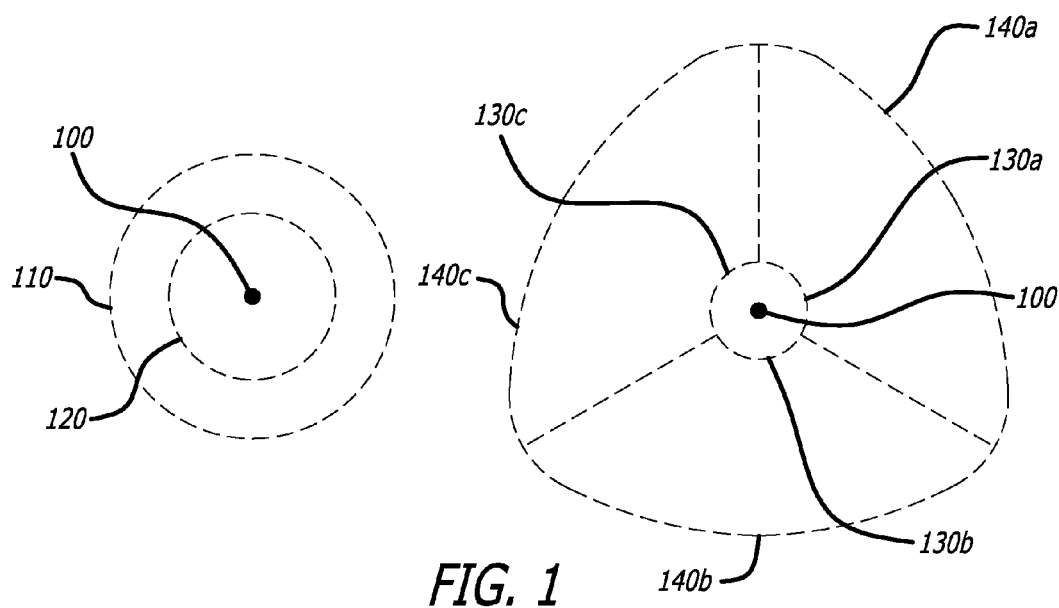
FIG. 1 shows antenna patterns.

FIG. 1 shows a representation of antenna radiation patterns. Omnidirectional antenna 100 when used to transmit information produces an omnidirectional radiation pattern, represented by circles 110 and 120. In wireless digital systems such as those operating under the various IEEE 802.11 standards, information is transmitted (and received) on channels in the 2.4 GHz and 5 GHz bands.

As is understood in the RF arts, interference can limit the effective range of communications. A transmitter and antenna such as 100 in FIG. 1 has an effective communications range shown by circle 120. Particularly in the 802.11 environment where the range of frequencies used by RF channels overlap and collision avoidance techniques are used, transmissions on the same or adjacent channels can cause interference to other devices, and can cause interference outside the ranges at which solid data transfers are possible. This interference range is shown as circle 110 of FIG. 1, covering more area than the communications range shown by circle 120.

An approach to improving communications is to use directional antennas to direct more RF energy to the desired receiver, such as by using antennas with directional patterns rather than omnidirectional patterns. Also shown in FIG. 1 are idealized radiation patterns for 120-degree sectorized antennas 130*a*, 130*b*, and 130*c*. Antenna 130*a* has a radiation pattern filling sector 140*a*, antenna 130*b* has a radiation pattern filling sector 140*b*, and antenna 130*c* has a radiation pattern filling sector 140*c*. Other approaches in addition to such sectorized, adaptive beam-forming, or smart antennas are often described as electronically steerable and rely on switching antennas and/or antenna elements, or altering the phasing between elements to increase antenna gain to try and mitigate interference and improve communications. Such electronically steered antennas may be used for transmission, reception, or both.

As is understood by the art, IEEE 802.11 wireless systems practice collision avoidance; prior to transmitting on a channel, a device monitors that channel for a predetermined period of time. If the device senses energy or carrier present on the channel, it backs off for a predetermined period of time, thus avoiding collisions which would occur if the device had started transmitting. It is understood that devices that are not within the directional pattern of another device, but are within the communication range, may not be able to hear the directional transmissions and hence may attempt to transmit causing further delays, collisions or interference. A well understood solution is to transmit a separate frame such as short CTS (Clear-to-Send) or equivalent frames in omnidirectional or another pattern prior to the directional transmission to prevent the devices outside of the directional pattern from attempting to transmit. This additional transmission of a separate frame prior to the beam-forming pattern incurs additional overhead thereby limiting the overall capacity.

According to an aspect of the invention, a device transmitting a digital frame of information transmits a first portion of the frame using a first antenna radiation pattern, switching to a second antenna radiation pattern at a predetermined point in the frame and transmitting the second portion of the frame using the second antenna radiation pattern. Transmit power delivered to the antenna system may also be varied between the first and second portions of the frame. The point at which the switching from one pattern to another occurs may vary per-frame depending on the nature and mode of transmissions. In one embodiment of frame-steering, the device transmits the first portion of the frame using a wide radiation pattern, such as the omnidirectional pattern 120 of FIG. 1, and the second portion of the frame using a narrower pattern, such as that shown using a sectorized antenna such as 130a producing pattern 140a of FIG. 1. The selection of the pattern used for the second portion of the frame depends on the location of the receiver. In an alternate embodiment, the first antenna radiation pattern may combine a wide radiation pattern with a narrower pattern, with only the narrower pattern being used for the second portion.

Figure 2:
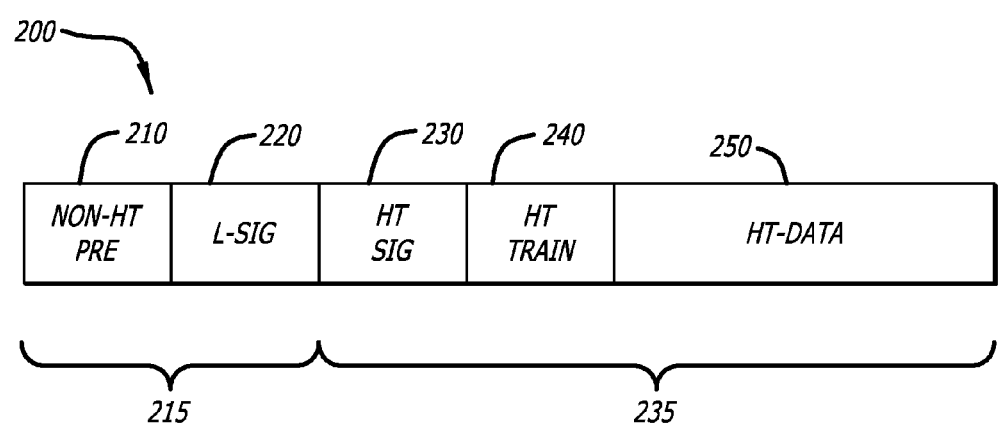
FIG. 2 shows a frame format.

FIG. 2. shows a sample frame 200 according to 802.11 standards, in this case a high-throughput (HT) frame typical of IEEE 802.11n communications. Such a frame consists of a broadcast or legacy portion 215 which has a non-HT preamble 210, legacy protection and PLOP data (L-SIG) 220, followed by the HT portion 235 which includes HT-sig 230, HT-training 240, and HT-data 250. One of the purposes of the L-SIG header is to allow HT 802.11n frames to be identified by older legacy 802.11a/b/g devices which cannot decode 802.11n. The HT portion 235 of the frame includes identification 230 and training 240 fields as well as the data 250 field. For some frames, such as HT frames, different modulation methods may be used for the broadcast or legacy portion 215 of the frame and the data or HT portion 235 of the frame. As an example, for 802.11n, the broadcast or legacy portion 215 of frame 200 consists of legacy long and short training sequences and robust BPSK-OFDM modulation signal field, while the HT portion 235 of frame 200 consists of HT long and short training sequences, HT-SIG with BPSK-OFDM and HT-Data with one of the less robust and more efficient OFDM modulations, BPSK, QPSK 16-QAM or 64-QAM.

According to an aspect of the invention, for multi-pattern frames, the broadcast portion 215 of frame 200 is transmitted using the first antenna radiation pattern, and the second portion 235 of frame 200 is transmitted using the second narrower antenna radiation pattern. By transmitting broadcast portion 215 of frame 200 over a wider area, nearby devices will sense this portion of the frame and back off, while switching to a narrower antenna pattern for second portion 235 of frame 200 which includes data 250, and allows more RF energy to be delivered to the target device.

Figure 3:
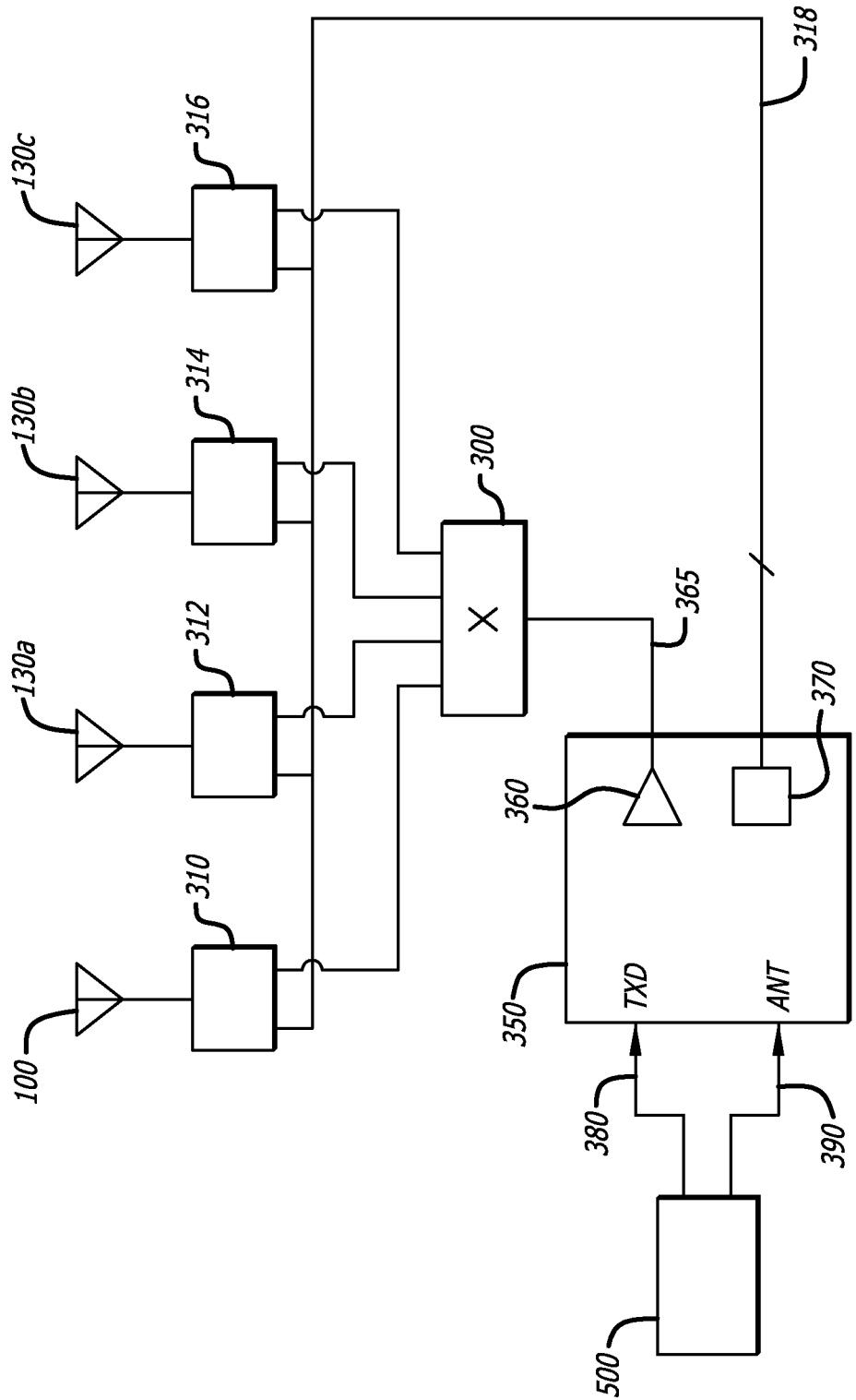
FIG. 3 shows a block diagram of a transmitter and antenna system.

FIG. 3 shows an embodiment of the invention. While the embodiment shows sectorized or switched antennas, it is equally applicable to other electronically steerable antenna systems. Antenna 100 is a broad-pattern antenna such as an omnidirectional antenna. Antennas 130a, 130b, and 130c are higher gain directional antennas such as sectorized antennas. As an example, three 120-degree sector antennas may be used, or four 90-degree sector antennas may be used.

These antennas 100, 130a, 130b, 130c are connected respectively to radio frequency (RF) switches 310, 312, 314, and 316. While these switches are preferably PIN diode switches, other technologies may also be used, provided they have the required switching speeds and isolation. As an example gated power amplifiers may be used. PIN diode switches for RF are known to the art, and are described for example in *The PIN Diode Circuit Designers' Handbook* published in 1998 by Microsemi Corporation, incorporated herein by reference. PIN diodes are available from numerous sources including Microsemi, Infineon, Vishay, and Avago Technologies. Switches are selected using control lines 318.

Switches 310, 312, 314, 316 are fed by RF distribution network 300, which may be a separate RF splitter such as those available from Mini-Circuits Corporation, or this functionality may be incorporated along with switches 310, 312, 314, 316.

The overall radiation pattern of an antenna may also be altered or steered by selecting elements of the antenna to feed, or by altering phasing among elements of an antenna or antenna array. Such an embodiment would have a block diagram similar to that of FIG. 3, where multiple elements 130a, 130b, 130c may be selected at any time, and/or the phasing of elements is varied. Switching antenna elements and/or altering phasing of elements may also be accomplished using PIN diode switches.

Transmitter 350 shown in block diagram form includes power amplifier 360 producing RF output 365 which feeds RF distribution network 300 and the switches and antennas. As shown, transmitter 350 includes antenna sequencer 370 which drives control lines 318 and controlling switches 310, 312, 314, 316. Transmitter 350 receives a transmit datastream 380 and antenna selection data 390 from controller 500. Portions of the transmitter such as local oscillators, mixers, I/Q modulators and the like not necessary to understand the invention are not shown.

According to the invention, when transmitting a multi-pattern frame, controller 500 provides transmitter 350 and its antenna sequencer 370 with information on which antenna pattern to use in the default configuration, such as for receiving, which antenna pattern to use for the first portion of the frame, and which antenna pattern to use for the second portion of the frame. Switching between the first and second patterns is initiated by transmitter 350 and its antenna sequencer 370.

As an example, transmitter 350 when transmitting a multi-pattern frame 200, first selects switch 310 and antenna 100 for the first portion of the frame, for example, broadcast portion 215 of FIG. 2. During transmission of the second portion 235 of frame 200, transmitter 350 switches off switch 310 and antenna 100 and switches on one of switches 312, 314, 316 and accompanying antenna 130a, 130b, 130c. Thus the first portion 215 of frame 200 is transmitted using a wide pattern, and the second portion 235 of frame 200 is transmitted using a narrow pattern.

In another example, transmitter 350 when transmitting a multi-pattern frame 200 selects switch 310 with antenna 100, and one of switches 312, 314, 316 and accompanying antenna 130a, 130b, 130c. The first portion 215 of frame 200 is thus transmitted using wide-coverage antenna 100 and one of the sectorized antennas. For the second portion 235 of frame 200, switch 310 and thus antenna 100 are disabled, so only the enabled sectorized antenna 130a, 130b, or 130c is used for transmitting. This results in the first portion 215 of frame 200 being transmitted using a combined wide and narrow pattern, with the second portion 235 only being transmitted using the narrow pattern.

Figure 4:
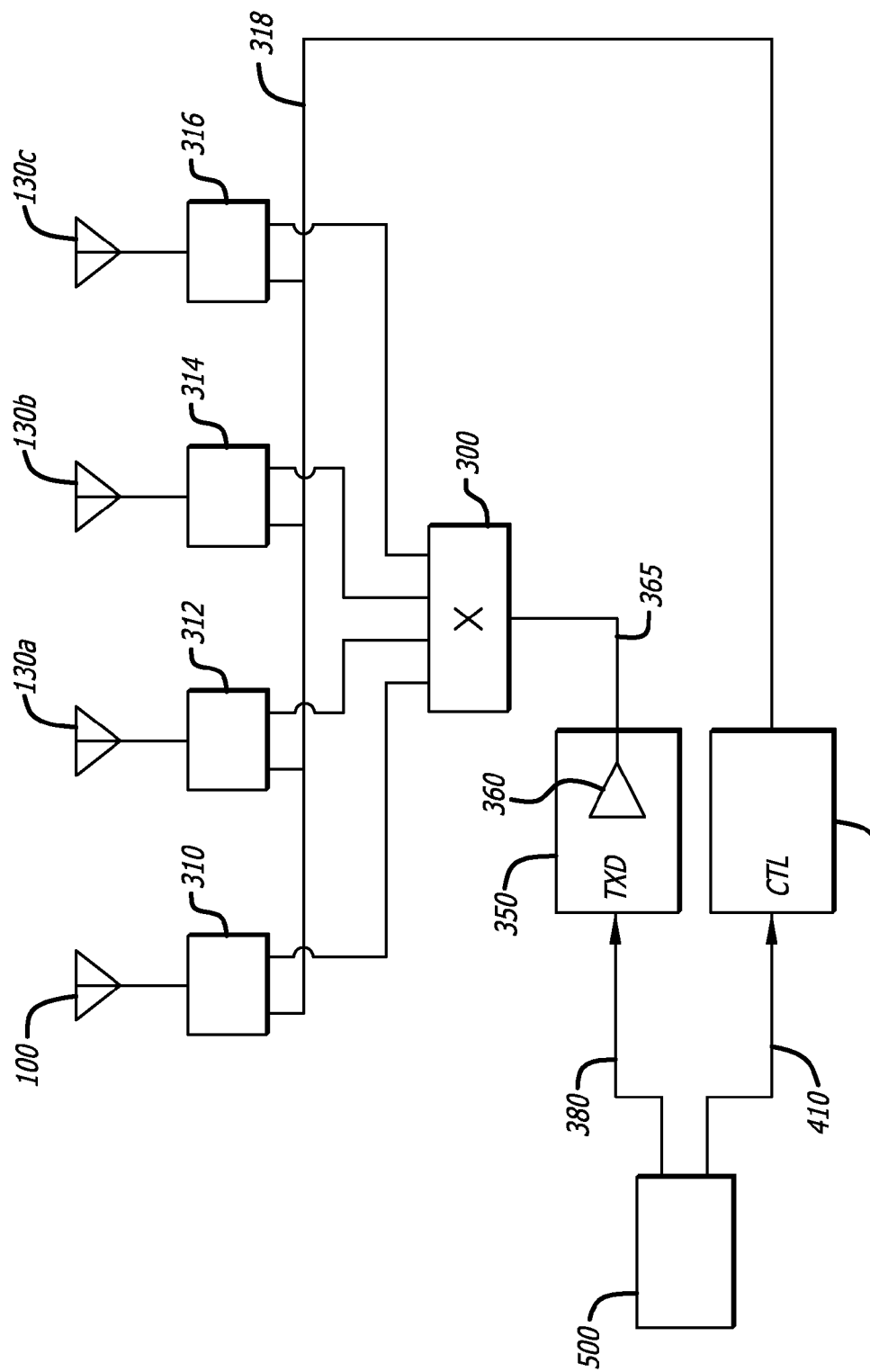
FIG. 4 shows another block diagram of a transmitter and antenna system.

According to the invention, a second embodiment is shown in FIG. 4. Where transmitter 350 of FIG. 3 generates antenna switching signals 318 directly, and thus must be designed and implemented in accordance with the invention, the embodiment of FIG. 4 uses an unmodified transmitter 350 and implements antenna switching along side the transmitter. This embodiment may be more applicable for use with standard designs and/or prebuilt transmitter and transmitter/receiver assemblies. Antenna selection 318 is provided by antenna controller 400 which receives antenna data 410 from controller 500. In such an embodiment, antenna pattern switching is timing based. When a multi-pattern frame is to be transmitted, controller 500 sends to antenna controller 400 information on which antenna pattern is to be enabled for the first period, the time of the first period, and information on which antenna pattern is to be used for the second period.

As an example, using a frame 200 such as shown in FIG. 2, the time required to transmit the first portion 215 of frame 200 is predetermined by controller 500. This time may vary from frame to frame, and over frame types. Controller 500 sends 410 antenna selection information and timing information to antenna controller 400. When controller 500 begins sending transmit data 380 to transmitter 350, controller 500 also signals 410 for antenna controller 400 to start its timing cycle. Assume antenna controller 400 has a counter chain which has been loaded with the time required to transmit the first portion 215 of frame 200. Antenna controller 400 begins counting when transmission begins, as signaled by controller 500. When the count completes, antenna controller 400 switches antennas as selected. Microsecond resolution is adequate for such a counter. This may be implemented, for example, using programmable logic such as a CPLD or FPGA for antenna controller 400, a counter-driven state machine, or even using a high-speed counter chain in a dedicated microprocessor. Suitable CPLDs and FPGAs are available from manufacturers such as Lattice Semiconductor, Altera, Xilinx, Atmel, and Cypress.

As with the embodiments of FIG. 3, in a first embodiment of FIG. 4 when transmitting a multi-pattern frame 200, controller 500 commands antenna controller 400 to select switch 310 and antenna 100 for the first portion of the frame, for example, broadcast portion 215 of FIG. 2. Controller 500 also sends antenna controller 400 the duration of the first portion of the frame, and the antenna to select when this portion is complete. Controller 500 then signals the start of the transmission, sending data 380 to transmitter 350. When the counter in antenna controller 400 expires, it switches off switch 310 and antenna 100 and switches on one of switches 312, 314, 316 and accompanying antenna 130a, 130b, 130c.

In an alternate embodiment, when transmitting a multi-pattern frame 200, controller 500 commands antenna controller 400 to select switch 310 with antenna 100, and one of switches 312, 314, 316 and accompanying antenna 130a, 130b, 130c. Controller 500 also sends antenna controller 400 the duration of the first portion of the frame. Controller 500 then signals the start of the transmission, sending data 380 to transmitter 350. The first portion 215 of frame 200 is thus transmitted using wide-coverage antenna 100 and one of the sectorized antennas. When the counter in antenna controller 400 expires, it switches off switch 310 and antenna 100, so only the enabled sectorized antenna 130a, 130b, or 130c is used for transmitting.

According to another embodiment of the invention in FIG. 3 or 4, controller 500 also sends the duration of the second portion of the frame, the antenna pattern to be used for receiving subsequent response frames, and duration for staying in the same pattern for receive mode, in addition to the first portion's duration and antenna patterns. The antenna controller switches to receive mode after the duration of the second portion is completed and/or transmit-to-receive transition is detected by other means so as to receive a response frame such as 802.11 Acknowledgement or 802.11 Block Acknowledgment using the same pattern used for the second portion of the frame, or a different pattern.

In all embodiments, the antenna controller is instructed to use a specific or default pattern for reception. As an example, in 802.11 the radio is always in receive mode unless the radio is transmitting a frame or sequence of frames.

According to an aspect of the invention, for multi-pattern frames, the broadcast portion 215 of the frame 200 is transmitted using the first antenna radiation pattern and a first transmit power level, and the second portion 235 of the frame 200 is transmitted using the second narrower antenna radiation pattern and a second power level. By transmitting broadcast portion 215 of frame 200 using a different transmit power, the interference range is controlled effectively, while switching to a narrower antenna pattern and a different transmit power for second portion 235 of frame 200 which includes data 250, and allows more RF energy to be delivered to the target device increasing the reliability of the communication. The differences in power levels may be implemented using a combination of power-amplifier control, controlling the drive level to the power amplifier, and/or switching attenuators between the transmitter and the antenna.

It should be noted that not all frames need be transmitted using the multi-pattern capability; selection of frames for multi-pattern transmission, as well as transmit power levels and the antenna patterns to be used is made by controller 500, or by other control elements of the larger system in which the transmitter is embedded.

While the invention has been described in terms of various embodiments, the invention should not be limited to only those embodiments described, but can be practiced with modification and alteration within the spirit and scope of the appended claims. The description is this to be regarded as illustrative rather than limiting. The applicant(s) hereby rescind any disclaimer of claim scope in the parent application or the prosecution history thereof and advice the USPTO that the claims in this application may be broader than any claim in the parent application.

What is claimed is:

1. A computer-implemented system, the system comprising:
   one or more processors;
   one or more non-transitory computer-readable storage mediums containing instructions configured to cause the one or more processors to perform operations including:
   transmitting, by a device including a hardware processor, a portion of a wireless data frame using an initial radiation pattern, wherein the wireless data frame portion is transmitted at an initial point of the transmission; and transmitting a different portion of the same wireless data frame using a different radiation pattern, wherein the different wireless data frame portion is transmitted at a different point of the transmission.

2. The system of claim 1, further comprising instructions configured to cause the one or more processors to perform operations including:
   transmitting a portion of a new wireless data frame using the initial radiation pattern, wherein the new wireless data frame portion is transmitted at the initial point of the transmission; and
   transmitting a different portion of the same new wireless data frame using the different radiation pattern, wherein the different new wireless data frame portion is transmitted at the different point of the transmission.

3. The system of claim 1, wherein radiation patterns include omnidirectional radiation patterns and directional radiation patterns.

4. The system of claim 1, wherein radiation patterns include wide radiation patterns and narrow radiation patterns.

5. The system of claim 1, wherein a wireless data frame portion is transmitted using a transmit power level.

6. The system of claim 1, wherein a wireless data frame portion is transmitted using a modulation method.

7. The system of claim 1, wherein wireless data frame portions include preambles.

8. The system of claim 1, wherein a point of transmission is pre-determined.

9. The system of claim 1, wherein wireless data frame portions include data payloads.

10. A computer-implemented method, comprising:
    transmitting, by a device including a hardware processor, a portion of a wireless data frame using an initial radiation pattern, wherein the wireless data frame portion is transmitted at an initial point of the transmission; and
    transmitting a different portion of the same wireless data frame using a different radiation pattern, wherein the different wireless data frame portion is transmitted at a different point of the transmission.

11. The method of claim 10, further comprising:
    transmitting a portion of a new wireless data frame using the initial radiation pattern, wherein the new wireless data frame portion is transmitted at the initial point of the transmission; and
    transmitting a different portion of the same new wireless data frame using the different radiation pattern, wherein the different new wireless data frame portion is transmitted at the different point of the transmission.

12. The method of claim 10, wherein radiation patterns include omnidirectional radiation patterns and directional radiation patterns.

13. The method of claim 10, wherein radiation patterns include wide radiation patterns and narrow radiation patterns.

14. The method of claim 10, wherein a wireless data frame portion is transmitted using a transmit power level.

15. The method of claim 10, wherein a wireless data frame portion is transmitted using a modulation method.

16. The method of claim 10, wherein wireless data frame portions include preambles.

17. The method of claim 10, wherein a point of transmission is pre-determined.

18. The method of claim 10, wherein wireless data frame portions include data payloads.

19. A computer-program product tangibly embodied in a non-transitory machine-readable storage medium, including instructions configured to cause a data processing apparatus to:
    transmit, by a device including a hardware processor, a portion of a wireless data frame using an initial radiation pattern, wherein the wireless data frame portion is transmitted at an initial point of the transmission; and
    transmit a different portion of the same wireless data frame using a different radiation pattern, wherein the different wireless data frame portion is transmitted at a different point of the transmission.

20. The computer-program product of claim 19, further comprising instructions configured to cause the data processing apparatus to:
    transmit a portion of a new wireless data frame using the initial radiation pattern, wherein the new wireless data frame portion is transmitted at the initial point of the transmission; and
    transmit a different portion of the same new wireless data frame using the different radiation pattern, wherein the different new wireless data frame portion is transmitted at the different point of the transmission.

21. The computer-program product of claim 19, wherein radiation patterns include omnidirectional radiation patterns and directional radiation patterns.

22. The computer-program product of claim 19, wherein radiation patterns include wide radiation patterns and narrow radiation patterns.

23. The computer-program product of claim 19, wherein a wireless data frame portion is transmitted using a transmit power level.

24. The computer-program product of claim 19, wherein a wireless data frame portion is transmitted using a modulation method.

25. The computer-program product of claim 19, wherein wireless data frame portions include preambles.

26. The computer-program product of claim 19, wherein a point of transmission is pre-determined.

27. The computer-program product of claim 19, wherein wireless data frame portions include data payloads.

* * * * *